Aug. 15, 1939．　　　W. Y. ABRESCH　　　2,169,781
AUTOMATIC TRUCK BRAKE
Filed April 7, 1939　　　2 Sheets-Sheet 2
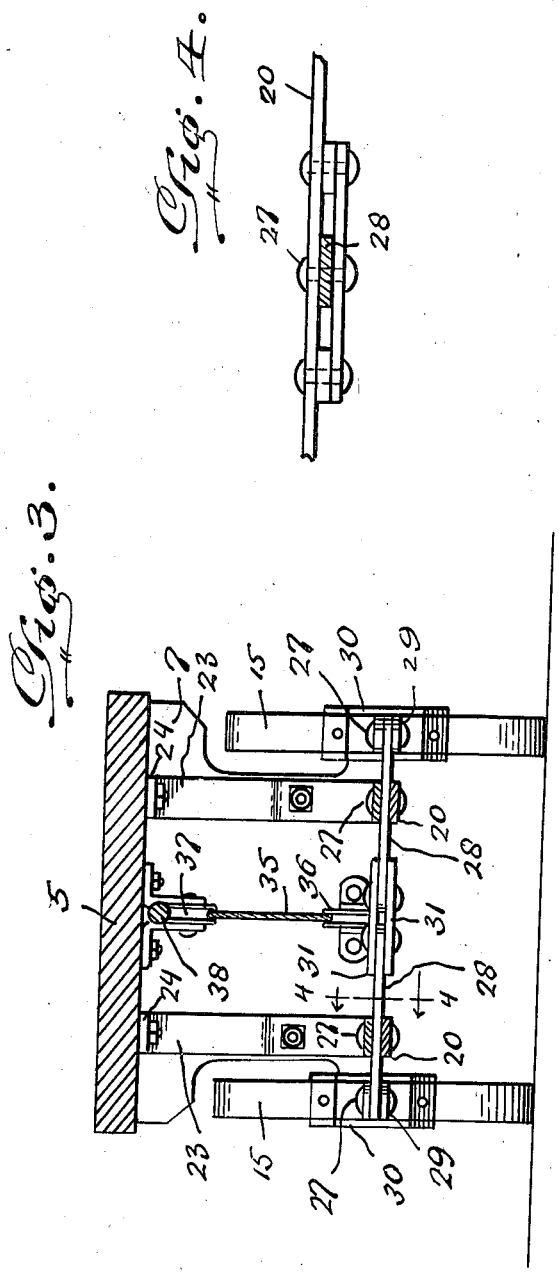
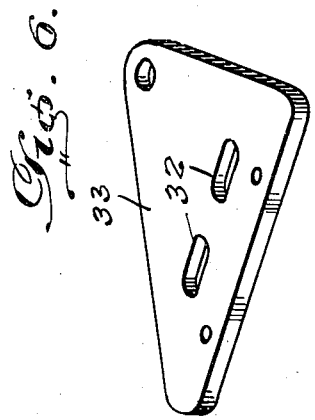
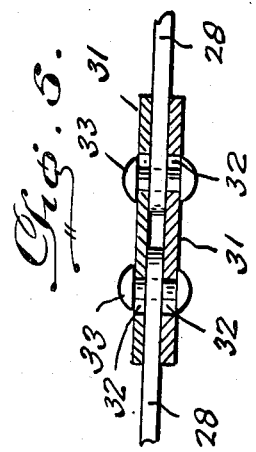
Inventor
William Y. Abresch
By Stanley Burch
Attorney Patented Aug. 15, 1939

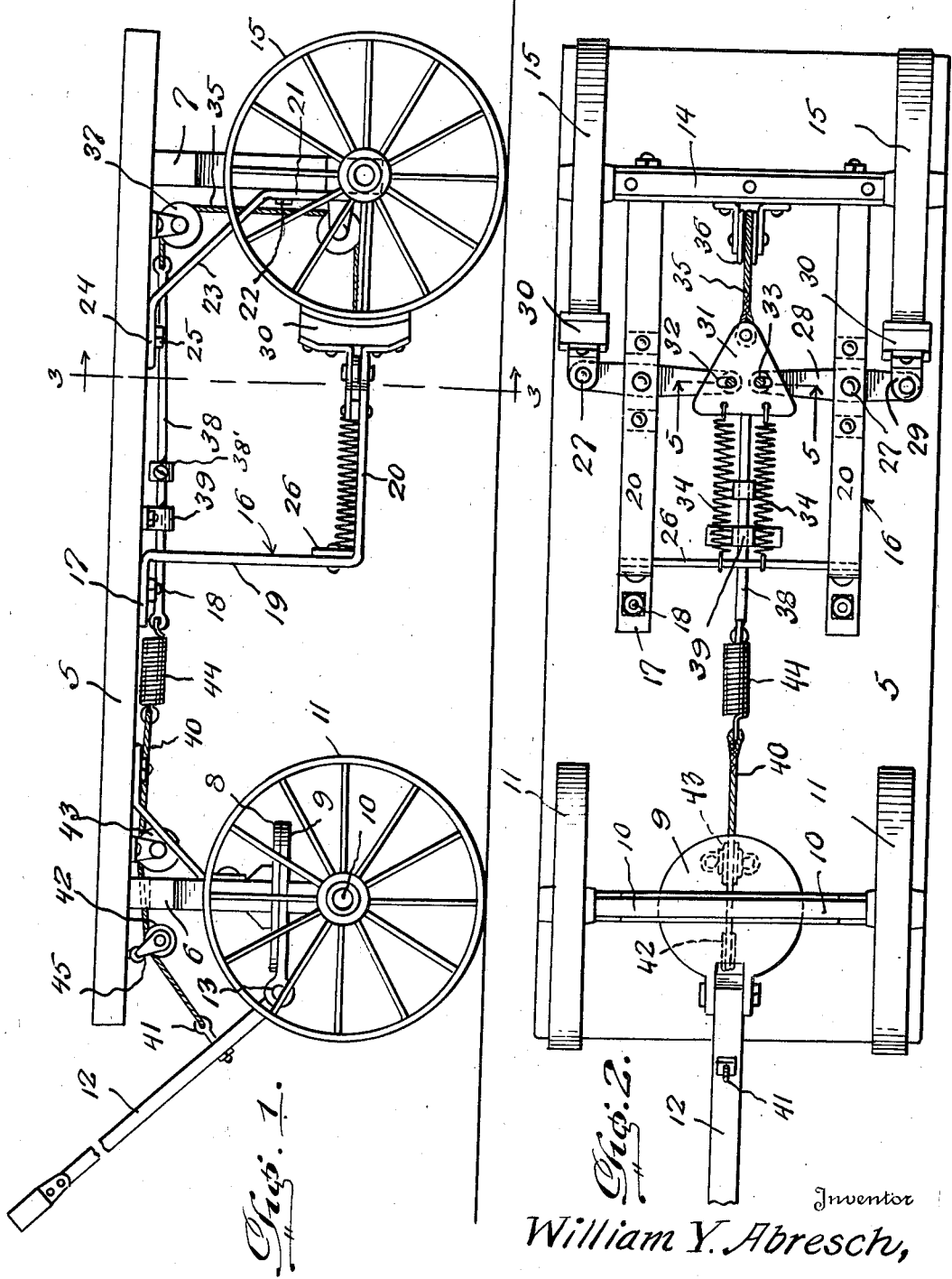

2,169,781

UNITED STATES PATENT OFFICE 2,169,781

AUTOMATIC TRUCK BRAKE

William Y. Abresch, Gastonia, N. C.

Application April 7, 1939, Serial No. 266,641

5 Claims. (Cl. 188—119)

This invention relates to automatic brakes for railway baggage and express trucks, and has for its primary object to provide an improved means for automatically braking the rear wheels and simultaneously raising the tongue of the truck when the latter is standing idle, thereby preventing various accidents and damages to the truck and its baggage or express load, such as are ordinarily caused by careless employees leaving the truck unchucked or unbraked.

Another object of the present invention is to provide a brake of the above kind which is automatically applied when the tongue of the truck is released and which is controlled by the tongue so that the brake shoes are released from the rear wheels of the truck when the tongue is lowered and used for pulling or pushing the truck about a station platform or the like.

Another important object of the present invention is to provide an improved operating connection between the brake shoes and the tongue of the truck whereby further downward movement of the tongue is permitted after release of the brake shoes from the rear wheels of the truck, thereby permitting positioning of the tongue at an angle most suitable or convenient for the particular size person using the truck.

Still another object of the present invention is to provide a connection between the tongue and the brake shoes which will effect equal release or application of the brake shoe as well as efficient operation of the latter. The present invention also aims to provide an improved construction of the above kind which is extremely simple and durable, efficient in operation, and readily applicable at small expense to existing baggage and express trucks.

The present invention consists in the novel form, combination and arrangement of parts hereinafter more fully described, shown in the accompanying drawings and claimed.

In the drawings:

Figure 1 is a side elevational view of a baggage or express truck having an automatic brake embodying the present invention.

Figure 2 is a bottom plan view thereof, partly broken away and in section.

Figure 3 is a transverse section on line 3—3 of Figure 1.

Figure 4 is a fragmentary section on the plane of line 4—4 of Figure 3, with parts omitted.

Figure 5 is a fragmentary section on line 5—5 of Figure 2; and

Figure 6 is a perspective view of the operating plate forming an operating connection between the pivoted brake bars and the connection with the truck tongue.

Referring in detail to the drawings, the present brake is shown applied to an express or baggage truck consisting of a platform 5 on the underside of which is mounted a front cross sill 6 and a rear cross sill 7, the front sill 6 having the upper member 8 of a fifth wheel fixed to the bottom thereof and resting upon the lower member 9 of said fifth wheel as well as suitably pivoted to the latter. The lower fifth wheel member 9 is secured upon a front axle 10 having the wheels 11 journaled upon the ends thereof, the axle 10 being thus mounted to swing about a vertical axis for the usual steering of the truck. The usual handle or tongue 12 is pivoted at its lower end to the lower fifth wheel member 9 as at 13, for use in pulling or pushing the truck about the station platform or the like. Fixed to the bottom of the rear cross sill 7 is the usual rear axle 14 having the rear wheels 15 journaled upon the ends thereof.

The present brake installation is shown as including a supporting frame including a pair of spaced strap irons 16 having horizontal forward end portions 17 bolted at 18 to the underside of the platform 5 intermediate the front and rear sills 6 and 7, said strap irons then depending as at 19 and having horizontal portions 20 extending rearwardly from the vertical portions 19 to the rear sill 7. The strap irons 16 then extend upwardly as at 21 against the front face of the rear sill 7 and are bolted to the latter as at 22, after which said strap irons extend forwardly and upwardly at an angle as indicated at 23 and terminate in horizontal rear end portions 24 bolted at 25 to the platform 5. The frame is completed by suitable cross pieces or braces connecting the strap irons 16, one of which cross pieces is shown at 26 bolted to and connecting the lower ends of the vertical portions 19 of said strap irons. It will also be noted that the inclined portions 23 of the strap irons 16 effectively brace the rear cross sill 7 with respect to the platform 5.

Pivoted intermediate their ends as at 27 to the horizontal portions 20 of the strap irons 16 intermediate the ends of said portions 20 are horizontal brake bars 28 to the outer ends of which are bolted rearwardly projecting members 29 carrying brake shoes 30 arranged to engage the rims of the rear wheels 15.

An operating connection is provided between the inner ends of the brake bars 28 and the tongue 12, and said connection includes a triangular operating plate 31 having transversely alined and transversely elongated slots 32 near the front wider end thereof. Bolts or pivot pins 33 extend through the inner ends of the brake bars 28 and the respective slots 32 so as to provide a slidable and pivotal connection between said bars 28 and plate 31. Helical tension springs 34 are connected at their rear ends to the forward wider end of plate 31 and at their forward ends to the transverse brace bar 26, thereby acting to yieldingly pull the plate 31 forwardly and normally apply the brake shoes 30 through swinging the inner ends of the brake bars 28 forwardly. The operative connection mentioned also includes a flexible member or cable 35 extending rearwardly from the plate 31 and around a guide pulley 36 mounted upon the lower portion of the rear sill 7, after which the member or cable 35 extends upwardly and around another guide pulley 37 mounted on the underside of the platform 5 directly in front of the rear sill 7. The upper end of cable 35 connects with the rear end of a rod 38 whose forward movement is limited by an abutment 38' and which is slidably mounted in a guide 39 on the underside of platform 5 for movement longitudinally of the latter. A flexible connection is then provided between the forward end of rod 38 and the tongue 12 including a cable or like flexible member 40 attached at its forward end to the tongue 12 as at 41 and extending rearwardly over guide pulleys 42 and 43 respectively mounted on the underside of platform 5 forwardly of and rearwardly of the front sill 6, the rear end of cable 40 being attached to the forward end of a spring 44 whose rear end is connected with the forward end of rod 38. It will be noted that the spring 44 is considerably stronger than the two springs 34 so that lowering of handle 12 will cause the springs 34 to be stretched for effecting release of the brakes as above described when the handle 12 is lowered, after which the spring 44 may stretch if further lowering of the handle 12 is desired for most convenient pulling of the truck by the particular person using the latter. At the same time, it will be seen that when the handle 12 is released, the springs 34 will effect application of the brake shoes 30 and raising of handle 12 to prevent accidental movement of the truck when remaining idle and to raise the handle 12 out of the way. The front guide pulley 42 is universally pivoted at 45 to the underside of platform 5 so that the same may turn to follow the portion of cable 40 forwardly thereof as is necessary when the tongue 12 is swung to one side or the other in the act of steering the truck. Also, the plate 31 is really preferably composed of two plate members of similar form between which the inner ends of the brake bars 28 extend as clearly shown in Figure 5, both plate members having the slots 32 in which the headed pins or bolts 33 are disposed.

From the foregoing description, it is believed that the construction and operation, as well as the advantages of the present invention, will be readily understood and appreciated by those skilled in the art. It will be particularly seen that the construction is simple and durable as well as efficient in operation, and that the same may be economically manufactured and readily installed. Minor changes in the specific details illustrated and described are contemplated within the spirit of the invention.

What I claim as new is:

1. In combination with a truck having rear supporting wheels and front supporting and steering wheels, and provided with a vertically swinging tongue for pulling and steering the truck, brake shoes arranged to engage said rear wheels, yieldable means acting to normally engage said brake shoes with said rear wheels, and an operating connection between said brake shoes and said tongue for releasing the brake shoes from said rear wheels when the tongue is lowered, said operating connection including a rod slidably mounted for movement longitudinally of the truck and having means to limit the forward movement thereof to a position wherein the brake shoes are released, and a yieldable connecting means between said rod and said tongue for permitting further lowering of the handle to a convenient pulling position after the brake shoes have been released.

2. In combination with a truck having rear supporting wheels and front supporting and steering wheels, and provided with a vertically swinging tongue for pulling and steering the truck, brake shoes arranged to engage said rear wheels, yieldable means acting to normally engage said brake shoes with said rear wheels, and an operating connection between said brake shoes and said tongue for releasing the brake shoes from said rear wheels when the tongue is lowered, said operating connection including a rod slidably mounted for movement longitudinally of the truck and having means to limit the forward movement thereof to a position wherein the brake shoes are released, a yieldable connecting means between said rod and said tongue for permitting further lowering of the handle to a convenient pulling position after the brake shoes have been released, said operating connection further including a flexible member connected to the tongue, and a guide for said flexible member universally pivoted to the front of the truck to permit lateral movement of said flexible member as the tongue is swung laterally in steering the truck.

3. In combination with a truck having rear supporting wheels and front supporting and steering wheels, and provided with a vertically swinging tongue for pulling and steering the truck, brake shoes arranged to engage said rear wheels, yieldable means acting to normally engage said brake shoes with said rear wheels, and an operating connection between said brake shoes and said tongue for releasing the brake shoes from said rear wheels when the tongue is lowered, said operating connection including a rod slidably mounted for movement longitudinally of the truck and having means to limit the forward movement thereof to a position wherein the brake shoes are released, a yieldable connecting means between said rod and said tongue for permitting further lowering of the handle to a convenient pulling position after the brake shoes have been released, a frame carried by the truck between the front and rear wheels, horizontal brake bars pivoted intermediate their ends to said frame for swinging movement about horizontal axes and having said brake shoes attached to the outer ends thereof, said operating connection including a triangular plate arranged with its broad end forward and provided in said forward broad end with transversely elongated and transversely alined slots, pivot pins extending through said slots and the respective inner ends of said brake bars, and a flexible member connected to the rear narrow end of said triangular plate and connected to the rear end of said rod, and guide pulleys for the last-named flexible member mounted rearwardly of said brake bars.

4. In combination with a truck having front and rear transverse sills, a fixed rear axle carried by the rear sill and having rear supporting wheels journaled on the ends thereof, a front axle pivoted to the front sill and having front steering and supporting wheels journaled on the ends thereof, a tongue pivoted to the front axle for vertical swinging movement, horizontal brake bars pivoted intermediate their ends directly forwardly of said rear wheels, brake shoes carried by the outer ends of said brake bars in position to engage said rear wheels, an operative connection between the inner ends of said brake bars and said tongue, said operating connection including guides mounted rearwardly of said brake bars, a flexible member extending from the inner ends of said brake bars rearwardly around said guides and then forwardly, means connecting said flexible member with the tongue, and a triangular plate having transversely elongated and transversely alined slots, and pins extending through said slots and the inner ends of said brake bars, said flexible member being attached to and extending rearwardly from said triangular plate whereby a pull upon said flexible member will cause equal application of the brake shoes.

5. In combination with a truck having front and rear transverse sills, a fixed rear axle carried by the rear sill and having rear supporting wheels journaled on the ends thereof, a front axle pivoted to the front sill and having front steering and supporting wheels journaled on the ends thereof, a tongue pivoted to the front axle for vertical swinging movement, horizontal brake bars pivoted intermediate their ends directly forwardly of said rear wheels, brake shoes carried by the outer ends of said brake bars in position to engage said rear wheels, an operative connection between the inner ends of said brake bars and said tongue, said operating connection including guides mounted rearwardly of said brake bars, a flexible member extending from the inner ends of said brake bars rearwardly around said guides and then forwardly, means connecting said flexible member with the tongue, the connection between said flexible member and said tongue including a bar slidably mounted for movement longitudinally of the truck, means for limiting the forward movement of said bar to a position wherein the brake shoes are released, and yieldable means connecting said rod with said tongue to permit downward movement of the tongue after the brake shoes have been released.

WILLIAM Y. ABRESCH.